Nov. 12, 1968  E. J. HENGEN ETAL  3,410,271
REMOVABLE FILLER ELEMENTS FOR THRESHING CYLINDER
Filed Dec. 6, 1965

INVENTORS
E. J. HENGEN
V. A. MAXSON

United States Patent Office 3,410,271
Patented Nov. 12, 1968

3,410,271
REMOVABLE FILLER ELEMENTS FOR
THRESHING CYLINDER
Edward J. Hengen and Vernon A. Maxson, Moline, Ill.,
assignors to Deere & Company, Moline, Ill., a corporation of Delaware
Filed Dec. 6, 1965, Ser. No. 511,754
9 Claims. (Cl. 130—27)

ABSTRACT OF THE DISCLOSURE

A combine threshing cylinder has a cylindrical supporting structure with a plurality of spike teeth attached to and extending radially outwardly from the periphery of the supporting structure, the teeth being disposed in axial rows equally spaced about the cylinder. An elongated plate is removably attached to the supporting structure over each row of teeth and has apertures through which the teeth project a short distance, the adjacent plates overlapping so that all the plates conjunctively form an approximate cylinder removably mounted around the supporting structure at the outer ends of the teeth.

This invention relates to an attachment for a threshing cylinder and more particularly to plate-like filler elements attachable to a tooth-type threshing cylinder to vary the aggressiveness of the threshing action.

The threshing mechanisms of modern combines conventionally include a threshing rotatable about a horizontal axis above an associated stationary concave, the crop being fed between the cylinder and the concave and threshed by impact therewith. Most threshing mechanisms generally utilize either a spike tooth or a rasp bar cylinder, both types of cylinders being well known, the former providing a more aggressive threshing action. The optimum threshing aggresiveness varies for the different crops, and in some crops, such as rice, edible beans, or grass seed, a spike tooth cylinder has given better results, while in most cereal grains, a rasp bar cylinder performs better. In fact, a spike tooth cylinder will not give satisfactory results when harvesting corn.

In some areas, combines are used to harvest different types of crops which require different types of threshing cylinders. While it is known to provide a combine with interchangeable threshing cylinders of both types in order that the preferable threshing action for the particular crop might be obtained, the changing of the threshing cylinder is a laborious and time-consuming job, and the provision of an alternate cylinder is also expensive.

According to the present invention, means are provided for converting a conventional spike tooth type threshing cylinder to a cylinder which provides a threshing action similar to a rasp bar type cylinder.

A more specific object is to provide a plurality of filler plates for attachment to the periphery of a conventional spike tooth cylinder to provide a cylinder having a peripheral configuration similar to a conventional rasp bar cylinder.

Another object is to provide such attachments which can be simply and quickly installed or removed without removal of the cylinder or the use of special tools and which can be provided in a compact kit form for purchase with a new combine or for combines already operating in the field.

These and other objects will become apparent from a consideration of the following detailed description and accompanying drawings wherein.

Figure 1:
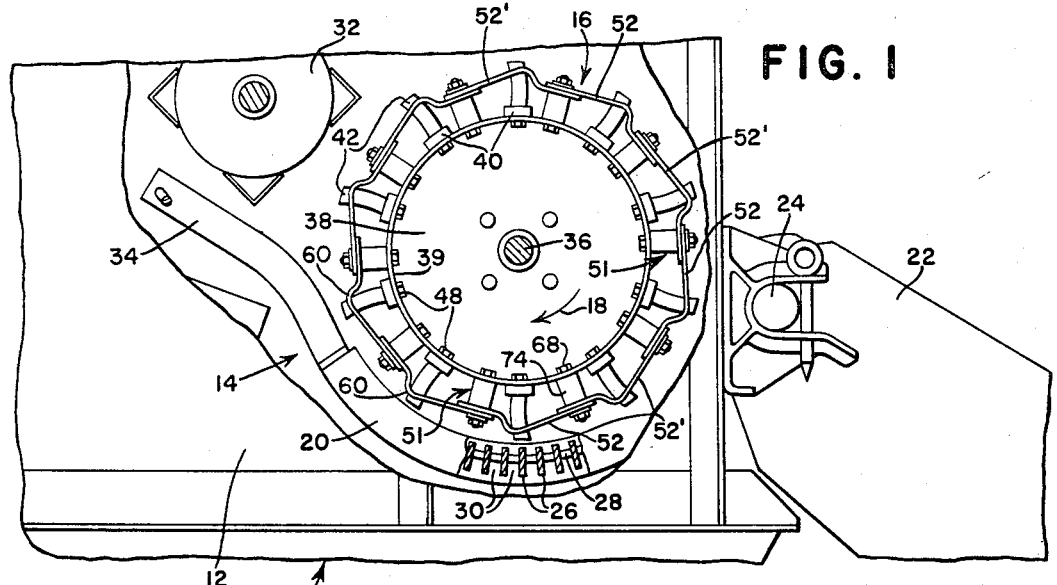
FIG. 1 is a fragmentary side elevation of a combine body with a portion of the side panel removed to show a typical threshing mechanism with the threshing cylinder filler plates installed.
Figure 2:
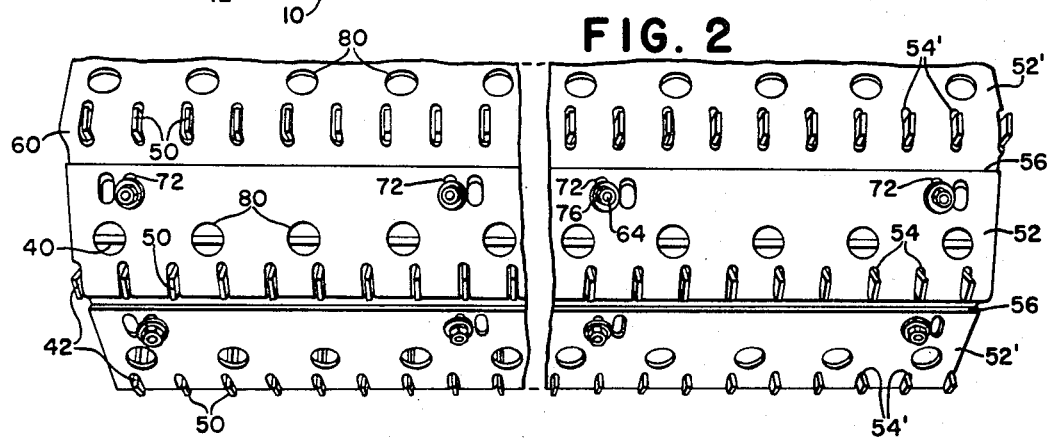
FIG. 2 is a fragmentary front perspective view of the threshing cylinder with the filler plates installed.
Figure 3:
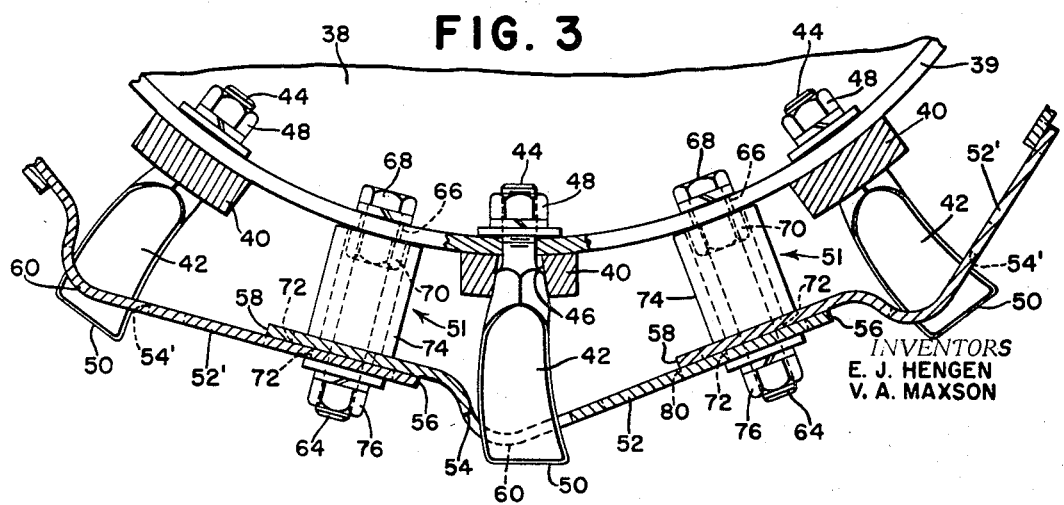
FIG. 3 is a fragmentary side elevation sectional view on an enlarged scale.

In FIG. 1, the numeral 10 represents a typical combine separator body, only a portion of which is shown. The body 10 includes a side panel 12, a portion of which is removed to show a threshing mechanism indicated generally by the numeral 14. The threshing mechanism 14 includes a transverse threshing cylinder 16 rotatable about its axis in the direction of the arrow 18 by conventional drive means (not shown) above an associated concave 20. The crops are removed from the field by a conventional harvesting means (not shown) and delivered rearwardly through a feeder house 22, pivotally mounted at the front of the body 10 on a transverse pivot 24, and through a forward opening in the body 10 to the threshing mechanism 14. The crop moves rearwardly between the rotating threshing cylinder 16 and the concave 20, most of the crop being separated at this point. The concave 20 is of conventional, grate-like construction and includes a plurality of transverse bars 26 interconnected by fore-and-aft rods 28, forming radial openings 30 through which the separated grain or the like falls. The remainder of the crop is thrown rearwardly to a rotating beater 32, which propels the crop rearwardly over a beater grate 34, attached to the rear of a concave 20, to straw walkers or the like (not shown) which completes the separation of the crop.

The threshing cylinder 16 includes an axial shaft 36, a plurality of axially spaced disk-like support members 38 coaxially mounted on the shaft 36 and having a peripheral rim 39, and a plurality of axially directed mounting bars 40 affixed to the outer periphery of the support members 38 at equal circumferential intervals and extending the length of the cylinder 16. A plurality of spike teeth 42, having threaded portions 44 at one end, are mounted on and extend radially from each mounting bar 40, the threaded portion 44 of each spike tooth extending through an aperture 46 in a mounting bar 40 and being secured thereto by a nut 48, the opposite terminal ends 50 of the spike teeth being equidistant from the threshing cylinder axis. The spike teeth on each mounting bar 40 form an axially directed row of equally spaced teeth, alternating rows of teeth being circumferentially aligned but unaligned with the teeth in the adjacent row. The number of mounting bars and the number of rows of teeth vary according to the size of the threshing cylinder, the threshing cylinder shown in FIG. 1 having ten rows of teeth. The above-described cylinder construction is more or less conventional and gives the cylinder a generally open or skeleton-like configuration.

The attachment for converting the threshing cylinder includes a plurality of elongated, axially extending, plate-like filler elements 52 and 52' mounted in an alternating side-by-side relationship around the periphery of the threshing cylinder 16 on fastener means 51 attached to the periphery of the support members 38. The filler elements 52 and 52' span the length of the cylinder 16 and are identical except for the location of an axially directed row of equally spaced radial apertures 54 and 54' respectively, which are adapted to receive the terminal ends 50 of the spike teeth 42, the apertures 54 being adapted to receive one row of spike teeth and the apertures 54' being axially offset from the apertures 54 to receive an adjacent row of teeth. The filler elements 52 and 52' have opposite longitudinal edges 56 and 58 and form an axially directed, outwardly projecting ridge or rib 60 along its entire length, the apertures 54 and 54' extending through the crest of each ridge 60. Each filler element has flat portions adjacent its opposite edges 56 and 58, the flat portions on each filler element being canted relative to each other. The filler elements are mounted with their flat portions overlapping and parallel to the flat portion on the adjacent filler element and conjunctively form an approximately regular prism having the same number of sides as there are filler elements and rows of teeth, the angle between the flat portions on each filler element being equal to 360° divided by the number of sides or elements. Thus, in a cylinder having ten rows of teeth and ten filler elements as shown in FIG. 1, the flat portions on each element are canted 36° relative to each other.

A fastener means 51 is mounted on each support member rim 39 between each mounting bar 40 and includes a bolt 64 extending radially outwardly through a bore 66 through the rim 39, each bolt having a head 68 engaging the interior side of the rim and being secured thereto by a nut 70 threaded on the bolt 64 and engaging the rim exterior. The terminal end of each bolt 64 extends through aligned apertures 72 through the overlapping flat portions of adjacent filler elements 52 and 52', and an annular spacer 74 is mounted around each bolt 64 between the outer periphery of the rim 39 and the inner side of the inner filler elements. A nut 76, threaded on each bolt 64 on the exterior side of the filler elements, tightly secures the filler elements against the spacer 74. Since each filler element is thus secured at axial intervals adjacent both lateral edges 56 and 58, it is rigidly attached to the threshing cylinder.

As is apparent from the drawings, when the filler elements are mounted on the cylinder 16, its profile is similar to a rasp bar cylinder, each ridge 60 functioning similar to a rasp bar. The projecting terminal ends 50 of the spike teeth 42 correspond to the peripheral corrugations on a conventional rasp bar. Thus, it is preferable that the leading edge of each spike tooth 42 be proximate to the leading edge of the respective ridge 60. The length of the spacer 74 establishes the distance that the terminal ends 50 project through the filler elements. It is also preferable that the terminal ends 50 project less than ⅜ inch from the crest of the ridge 60, since a greater projection would tend to fracture the cob when harvesting corn. The leading edge of each ridge should be relatively abrupt to provide an aggressive feeding action and it is also preferable that the height of the ridge 60 be approximately between ¾ inch and one inch to provide a satisfactory feeding action. The configuration of the filler elements between the rows of spike teeth is not critical, except that they should not provide a depression large enough to accommodate an ear of corn and permit it to pass unthreshed.

Each filler element also has a plurality of radial openings 80 to permit the escape of trash from the cylinder interior, the location and the size of the opening 62 being immaterial except that they must not be large enough to permit the introduction of corn cobs to the cylinder interior.

In operation, when it is desired to convert the spike tooth type threshing cylinder to a rasp bar type cylinder, the feeder house 22 is removed to provide access to the threshing cylinder 16 through the forward inlet opening. If the bores 66 through the support member rims 39 are not already provided, they can be easily drilled through the inlet opening by rotating the cylinder in increments to position successive areas of the rims 39 opposite the inlet opening. The bolts 64 are then inserted through the bores 66 and secured by the nuts 70, the open, skeleton-like construction of the threshing cylinder permitting access to the cylinder interior. This operation can also be accomplished through the inlet opening by rotating the cylinder in increments. The spacers 74 are then mounted around each bolt 64 and the filler elements 52 and 52' are then mounted in their alternating overlapping relationship, by placing the filler elements against the spacers 74 with the bolts 64 extending through the apertures 72 and the spike teeth 42 extending through the apertures 54 and 54', and threading the nuts 76 on the bolts 64 to lock the filler elements in position. The filler elements can also be mounted through the front inlet opening by rotating the cylinder in increments to position successive portions of the cylinder periphery opposite the inlet opening. By reversing the above procedure, the filler elements can be simply removed to reconvert the threshing cylinder to a spike tooth type cylinder.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a threshing cylinder of the type having an axial shaft, a generally cylindrical supporting structure coaxially mounted on the shaft and a plurality of spiked teeth mounted on and extending generally radially outwardly from said supporting structure and having outer terminal ends substantially equidistant from said cylinder axis, the combination therewith of a plurality of filler elements disposed radially outwardly from the periphery of the supporting structure and fastener means for removably attaching said filler elements to said structure, said filler elements conjunctively filling the peripheral interstices between the outer terminal ends of said spiked teeth.

2. The invention defined in claim 1 wherein said filler elements form a plurality of axially extending, outwardly projecting ridges on the periphery of said cylinder.

3. The invention defined in claim 2 wherein said filler elements have a plurality of apertures through which the terminal ends of said spike teeth project a relatively short distance.

4. The invention defined in claim 2 wherein each filler element is elongated in an axial direction and has the same length as the threshing cylinder, and the filler elements are mounted side-by-side around the periphery of the threshing cylinder spanning the length of the threshing cylinder.

5. The invention defined in claim 4 wherein the filler elements are plate-like in construction and have outer surfaces extending in a generally circumferential direction around said threshing cylinder.

6. The invention defined in claim 5 wherein the fastener means includes a plurality of bolts extending radially outwardly from the supporting structure, each filler element including a plurality of apertures through which the bolts extend, spacer means around each bolt operably engaging the inner surface of a filler element to limit the inward movement of said filler elements, and nut means threaded on each bolt and operably engaging the outer surface of the filler elements to limit the outward movement of said filler element.

7. The invention defined in claim 5 wherein the spike teeth are mounted on the supporting structure in generally axially directed rows, and each plate-like filler element forms an axially extending ridge between the terminal ends of the spike teeth in one row.

8. The invention defined in claim 7 wherein each filler element has a plurality of radial apertures along said ridge through which the terminal ends of said spike teeth project a relatively short distance.

9. The invention defined in claim 8 wherein each plate-like filler element is relatively flat adjacent its longitudinal sides and a portion of the flat area on each filler area overlaps a portion of the flat area on the adjacent element.

References Cited

UNITED STATES PATENTS

| | | | |
|---|---|---|---|
| 2,626,611 | 1/1953 | Nixon | 130—27.8 |
| 2,760,492 | 8/1956 | Allen | 130—27.8 |
| 3,126,014 | 3/1964 | Bonner et al. | 130—27.8 |
| 3,259,134 | 7/1966 | Stokland | 130—27 |

ANTONIO F. GUIDA, *Primary Examiner.*